United States Patent [19]

Beltz

[11] 3,933,005

[45] Jan. 20, 1976

[54] HIGH PRESSURE COMPRESSOR CUT-OFF SWITCH

[75] Inventor: John H. Beltz, Sterling Heights, Mich.

[73] Assignee: General Motors Corporation, Detroit, Mich.

[22] Filed: Oct. 15, 1974

[21] Appl. No.: 514,295

[52] U.S. Cl. .................... 62/228; 62/230; 62/243; 417/279
[51] Int. Cl.² .......................................... F25B 1/00
[58] Field of Search ....... 62/228, 230, 243; 417/279

[56] References Cited
UNITED STATES PATENTS

| | | | |
|---|---|---|---|
| 1,535,936 | 4/1925 | Mercer | 62/228 |
| 2,449,740 | 9/1948 | Felser | 417/279 |
| 2,904,971 | 9/1959 | Kosfeld | 417/279 |
| 3,241,332 | 3/1966 | Harlin | 62/228 |
| 3,411,313 | 11/1968 | Brown | 62/228 |
| 3,765,191 | 10/1973 | Canter | 62/228 |

Primary Examiner—William J. Wye
Attorney, Agent, or Firm—K. H. MacLean, Jr.

[57] ABSTRACT

A combination high pressure relief valve and magnetic clutch disconnect switch for an air conditioning compressor which utilizes an automatically resetting valve member. The escape of pressurized refrigerant under control of the relief valve pressurizes the interior of a cap member on the end of the relief valve and thereby disconnects the ground circuit portion of the electromagnetic compressor clutch. This renders the system inoperative until the cap can be replaced and the original cause of the high pressure is determined and remedied.

2 Claims, 3 Drawing Figures

U.S. Patent  Jan. 20, 1976  3,933,005
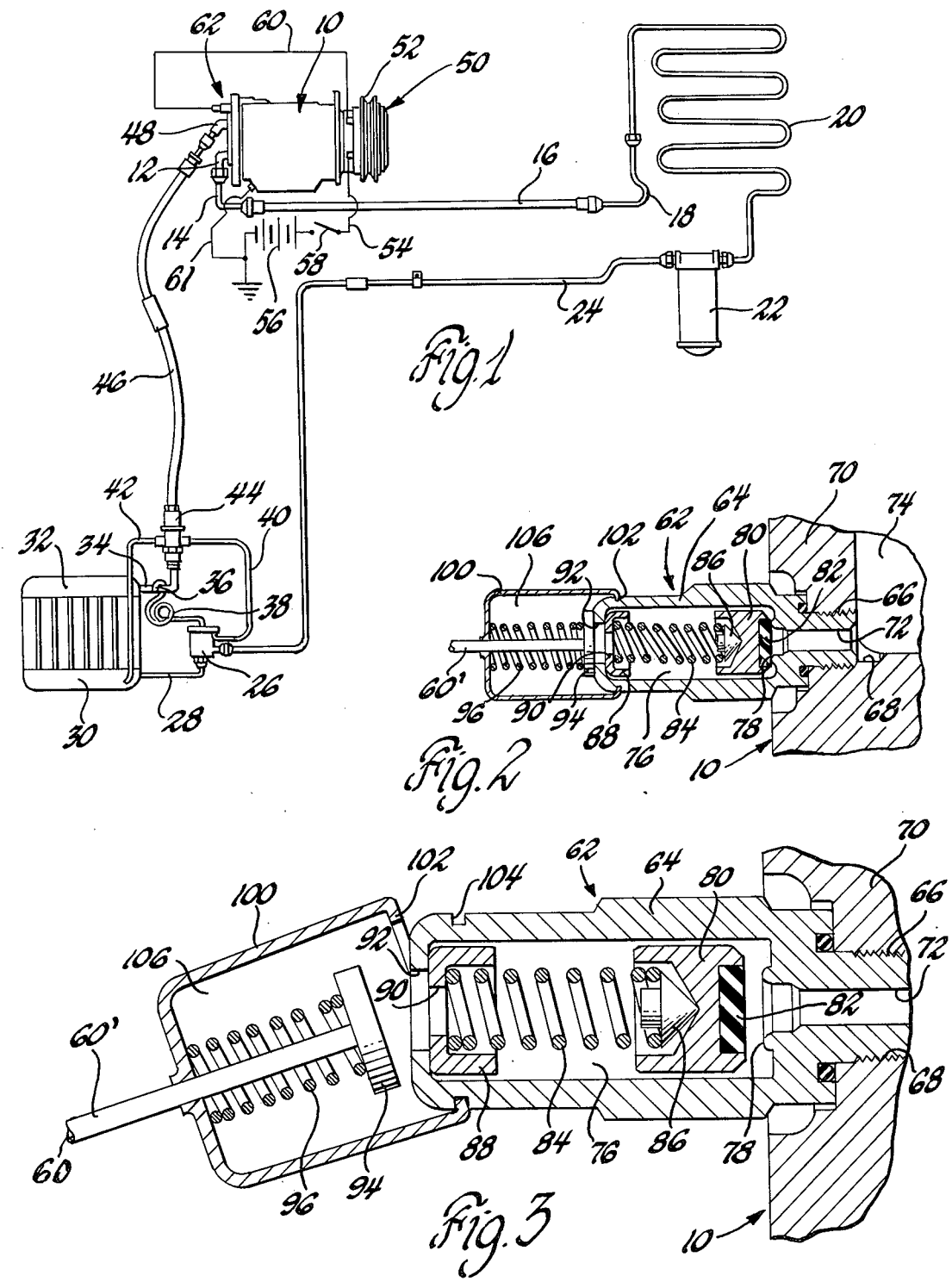

HIGH PRESSURE COMPRESSOR CUT-OFF SWITCH

This invention relates to a pressure relief valve for an air conditioning compressor and more particularly to a relief valve combined with an electromagnetic clutch disconnect switch activated when high pressure conditions occur.

It is common in the air conditioning field to provide a pressure responsive relief valve to vent refrigerant to atmosphere and thereby decrease pressure. The abnormally high pressure may be produced by heat caused by excessive friction of the compressor. This may be related to a shortage of lubricating oil in the refrigerant. Discharging some of the refrigerant to atmosphere does not remedy this shortage. If the compressor is reactivated, enough heat may be generated to cause damage.

The present invention provides a combination pressure relief valve having an automatically resetting valve member and an electromagnetic clutch disconnect mechanism which in response to the escape of pressurized refrigerant deactivates the clutch circuit. The disconnect mechanism can be easily reassembled to the relief valve to reconnect the compressor in an emergency before the cause of the high pressure is remedied.

The combination pressure relief valve and compressor disconnect mechanism is simple and efficient in responding to high refrigerant pressures. The simplicity goes far in providing the reliability and low cost necessary in automobile air conditioning systems. In addition, the automatic reset of the release valve and the ease in reconnecting the clutch disconnect mechanism provides desirable low maintenance.

Therefore, an object of the present invention is to provide a simple but effective combination pressure relief valve and compressor clutch disconnect mechanism for venting high pressure refrigerant from a compressor to produce a pressure force on a clutch circuit connector to deactivate the compressor electromagnetic clutch.

A further object of the present invention is to provide a simple and inexpensive combination pressure responsive relief valve and compressor clutch disconnect mechanism which releases a sufficient quantity of high pressure refrigerant to reduce the high pressure within the compressor and then automatically resets itself, while simultaneously producing a pressure force by the released refrigerant on a deformable clutch disconnect member which separates from the relief valve to render the compressor inoperative.

Further objects and advantages of the present invention will be readily apparent from the following detailed explanation, reference being had to the accompanying drawings in which a preferred embodiment is illustrated.

In the drawings:

FIG. 1 is a somewhat schematic illustration of an automobile air conditioning system having the subject combination pressure relief valve and compressor disconnect mechanism;

FIG. 2 is an enlarged sectional view of the subject combination relief valve and disconnect mechanism in a normal mode of operation;

FIG. 3 is a view similar to FIG. 2 and showing the combination valve and disconnect mechanism in the interina between the first function mode of FIG. 2 and a second disconnect mode of operation which occurs after exposure to high pressure.

In the drawings, FIG. 1 illustrates an automotive air conditioning system including a compressor 10. Compressor 10 is of the axially reciprocating piston type, details of which are disclosed in the U.S. Pat. No. 3,057,545 to G. P. Ramson, which issued Oct. 9, 1962. The compressor 10 has an outlet fitting 12 connected by conduit 14, resilient hose 16 and conduit 18 to a condenser 20 which is normally located at the front of the automobile immediately in front of the radiator. Condenser 20 is connected to a receiver 22 whose function is to separate liquid refrigerant from vaporous refrigerant and pass only the liquid on.

Refrigerant passes from receiver 22 through conduit 24 to the inlet of a thermal expansion valve 26 whose function is to regulate the flow of refrigerant through conduit 28 to a bottom portion 30 of evaporator 32. The expansion valve 26 opens and closes in response to heat sensed at the evaporator outlet 34 by a thermal bulb 36 which is connected to valve 26 by capillary tube 38. A conduit 40 supplies compressor inlet pressure to the expansion valve for equalization purposes. A second conduit 42 draws oil from the lower part 30 of evaporator 32 and passes it to the compressor 10. For a more detailed discussion of valve 26, reference is made to U.S. Pat. No. 2,856,759 issued on Oct. 21, 1958, to Barbulesco.

After passing through evaporator 32, the refrigerant flows through a suction throttling valve 44 whose function is to maintain the refrigerant pressure within the evaporator above the level necessary to prevent low temperatures which permit frost formation on the external surfaces. After flowing through the suction throttling valve 44 the refrigerant passes through hose 46 to an inlet fitting 48 of compressor 10. For a more detailed discussion of the valve 44, reference is made to U.S. Pat. No. 3,121,373 issued on February 18, 1964, to Murphy et al.

An electromagnetic clutch assembly 50 is operably connected to the shaft (not visible) of compressor 10. The clutch assembly 50 has a pulley with a groove 52 therein adapted to engage a V-type belt which engages a similar pulley on the crankshaft of an automobile engine. The electromagnetic clutch assembly 50 is of the type shown in U.S. Pat. No. 3,205,989 to R. N. Mantey, issued Sept. 14, 1965. Basically, the clutch includes a portion attached to the compressor shaft and the pulley portion with groove 52 therein which are connectively drawn together by a force produced by an electromagnetic coil. During normal compressor operation the coil is energized by a circuit with a conductor 54 extending from battery 56 through an on-off switch 58 to one lead of the coil. The other lead of the clutch coil is connected by a conductor 60 to the combination pressure relief valve and clutch disconnect mechanism 62 and to ground through the compressor housing and a ground conductor 61.

The subject pressure relief valve and clutch disconnect mechanism 62 is shown in FIGS. 2, 3. The switch includes a housing 64 which has a threadable end portion 66 received in a threaded bore 68 of compressor end member 70. The housing 64 has a relief passage 72 therein which extends from the outlet cavity 74 of compressor 10 to the interior 76 of housing 64. A valve seat passage 78 is formed on the end of housing 64 around the relief passage 72. A movable valve member 80 within interior 76 carries a resilient pad 82 adapted to engage the valve seat 78 to prevent leakage of refrigerant thereby when the valve 80 is held in a closed operative position as in FIG. 2 by coil spring 84. Spring 84 engages a cone shaped member 86 whose pointed end contacts the valve 80. The other end of spring 84 engages a cupshaped retainer 88 which is supported by the turned over end of housing 64.

When the pressure of refrigerant in outlet cavity 74 exceeds a predetermined value, the valve 80 is moved to the left as shown in FIG. 3 and refrigerant flows between the housing 64 and valve 80, then through openings 90, 92 in members 88 and 64. The refrigerant then flows around a terminal member 94 which contacts the end of housing 64 under the influence of a spring 96. Terminal 94 is attached to the conductor wire 60 and passes through a cup-shaped connector 100 with connector 100 and the insulative portion 60' of conductor 60 being tightly fitted with respect to one another forming a fluid tight seal therebetween and electrically isolating the conductor 60 from connector 100. The connector 100 has an open end surrounded by an inturned peripheral edge 102 which engages a groove 104 in housing 64. The connector 100 defines a closed interior space 106 about the end of housing 64 into which refrigerant is discharged. The pressure level in space 106 increases until connector 100 is distorted sufficiently to remove the edge 102 from groove 104 and release refrigerant to the atmosphere. When this occurs, the connector 100 falls away from the end of housing 64 and disengages the terminal member 94 from the end of housing 64 to open the electromagnetic circuit and deactivate the compressor 10.

When the pressure level of refrigerant within compressor outlet cavity 74 returns to a normal level, spring 84 moves the valve member 80 to the right and engages pad 82 with valve seat 78 to seal the remaining refrigerant within the compressor. The operator of the vehicle may reconnect the connector 100 if undamaged by fitting the edge 102 in groove 104. This connects the terminal 94 with the end of housing 64 and completes the circuit through the electromagnetic circuit. The simple fact that connector 100 was disconnected warns the operator that service of the air conditioning system is desirable. The reason for the extraordinary pressurization of the compressor may be repeated as long as the causation is not corrected. If reconnected under these circumstances, deactivation of the compressor a second time is probable.

Although the embodiment illustrated is a preferred embodiment, other embodiments may be adapted.

What is claimed is as follows:

1. A combination pressure relief valve and disconnect switch adapted for use with an air conditioning compressor which is activated by the energization of an electromagnetic clutch comprising: a valve housing enclosing an interior space and having a relief passage extending therefrom for connection to the outlet portion of the compressor; a valve seat formed around the end of the relief passage; valve means within said interior space normally engaging said valve seat to prevent fluid flow therebetween when the fluid pressure in the compressor outlet is below a predetermined level and being movable away from said valve seat in response to said predetermined fluid pressure to discharge excess pressurized fluid into said interior space; a generally cup-shaped connector member having a hollow interior and an open end; said open end having turned-in edge means engaging said valve housing and sealingly enclosing said connector interior; said valve housing having a fluid relief passage connecting the interiors of said housing and said connector; a clutch terminal member normally held in electrical contact with said housing by said connector member to close a clutch energization circuit whereby pressurization of said connector interior by opening of the valve causes separation of the inturned edge and said valve housing and opening of said clutch circuit by the resultant disconnection of said terminal member and said valve housing.

2. A combination pressure relief valve and disconnect switch adapted for use with an air conditioning compressor which is activated by the energization of an electromagnetic clutch comprising: a valve housing enclosing an interior space and having a relief passage extending therefrom for connection to the outlet portion of the compressor; a valve seat formed around the end of the relief passage; valve means within said interior space normally engaging said valve seat to prevent fluid flow therebetween when the fluid pressure in the compressor outlet is below a predetermined level and being movable away from said valve seat in response to said predetermined fluid pressure to discharge excess pressurized fluid into said interior space; a generally cup-shaped connector member having a hollow interior and an open end; said connector member having an inwardly directed edge portion encircling said open end; said valve housing having a groove therein adapted to be engaged by said edge portion of said connector to connect said valve housing and connector member and sealingly enclose said connector interior; said valve housing having a fluid relief passage connecting the interiors of said housing and said connector; a clutch terminal member normally held in electrical contact with said housing by said connector member to close a clutch energization circuit whereby pressurization of said connector interior by opening of the valve, causes separation of the inturned edge and said valve housing and opening of said clutch circuit by the resultant disconnection of said terminal member and said valve housing.

* * * * *